United States Patent
Shin et al.

(10) Patent No.: US 9,207,509 B2
(45) Date of Patent: Dec. 8, 2015

(54) LIQUID CRYSTAL DISPLAY DEVICE AND METHOD OF FABRICATING THE SAME

(71) Applicant: LG Display Co., Ltd., Seoul (KR)

(72) Inventors: Min-Chul Shin, Jeollanam-do (KR); Beum-Sik Cho, Paju-si (KR); Jung-Pil Ryu, Seoul (KR); Haruhisa Iida, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 34 days.

(21) Appl. No.: 14/135,962

(22) Filed: Dec. 20, 2013

(65) Prior Publication Data
US 2015/0062511 A1 Mar. 5, 2015

(30) Foreign Application Priority Data
Aug. 30, 2013 (KR) ......................... 10-2013-0104332

(51) Int. Cl.
*G02F 1/1333* (2006.01)
*G02F 1/1362* (2006.01)
*G02F 1/1345* (2006.01)

(52) U.S. Cl.
CPC ........ *G02F 1/136286* (2013.01); *G02F 1/1333* (2013.01); *G02F 1/1345* (2013.01); *G02F 1/136204* (2013.01); *G02F 2001/13629* (2013.01)

(58) Field of Classification Search
CPC ................................................ G02F 1/136204
USPC .......................................................... 349/40
See application file for complete search history.

(56) References Cited

U.S. PATENT DOCUMENTS

| | | | |
|---|---|---|---|
| 8,159,626 B2* | 4/2012 | Hwang et al. | 349/40 |
| 2007/0046845 A1* | 3/2007 | Liou et al. | 349/40 |
| 2008/0180591 A1* | 7/2008 | Shie | 349/40 |
| 2009/0310052 A1* | 12/2009 | Huang et al. | 349/40 |
| 2009/0310055 A1* | 12/2009 | Kim et al. | 349/58 |
| 2010/0156770 A1 | 6/2010 | Shin et al. | |

FOREIGN PATENT DOCUMENTS

| | | |
|---|---|---|
| JP | 2007-033760 A | 2/2007 |
| JP | 2012-185513 A | 9/2012 |
| TW | 200532306 A | 10/2005 |
| WO | 2004072941 A2 | 8/2004 |

\* cited by examiner

*Primary Examiner* — Thanh-Nhan P Nguyen
(74) *Attorney, Agent, or Firm* — Dentons US LLP

(57) ABSTRACT

Disclosed are a liquid crystal display device and a method for fabricating the same. The liquid crystal display device includes first and second substrates joined to and facing each other, a TFT formed in each pixel of an active area on the first substrate, a first discharge line formed in a non-active area on the first substrate, a protective layer formed over the entire surface of the first substrate, including the TFT and the first discharge line, a second discharge line surrounding an outer region of the first discharge line in the non-active area on the first substrate, a plurality of contact holes passing through the protective layer to expose a portion of the first discharge line, a connection pattern branching from the second discharge line, and covering the respective contact holes, and an electrostatic discharge layer formed on the outside surface of the second substrate.

10 Claims, 3 Drawing Sheets

LIQUID CRYSTAL DISPLAY DEVICE AND METHOD OF FABRICATING THE SAME

CROSS-REFERENCE TO RELATED APPLICATIONS

This application claims the benefit of Korean Patent Application No. 10-2013-0104332, filed on Aug. 30, 2013 which is hereby incorporated by reference for all purposes as if fully set forth herein.

BACKGROUND OF THE INVENTION

1. Field of the Invention

The present invention relates to a liquid crystal display device and a method for fabricating the same.

2. Discussion of the Related Art

In accordance with the development of a variety of portable electric appliances such as mobile communication terminals and notebook computers, the demand for flat panel display devices for application to such appliances is increasing. Liquid crystal display devices, plasma display panels, field emission display devices and light emitting diode display devices and the like are researched as the flat panel display devices.

Of the flat panel display devices, the application of liquid crystal display devices is expanding due to advantages such as development of mass-production technology, ease of driving, low power consumption and implementation of high image quality and wide screen.

A general liquid crystal display device includes a liquid crystal panel in which a lower substrate is joined to an upper substrate such that they face each other via a liquid crystal layer and a driving circuit to apply a driving voltage and signal to the liquid crystal panel. The liquid crystal display device controls transmittance of light passing through liquid crystal layers respectively provided in a plurality of cells (pixels) according to data voltage and thereby displays an image in response to the image signal.

FIG. 1 shows a related art liquid crystal display device.

Referring to FIG. 1, the related art liquid crystal display device includes a lower substrate 10 (TFT array substrate), an upper substrate 30 (color filter array substrate), a liquid crystal layer 20, an adhesive layer 40, an electrostatic discharge layer 50 and a polarizing film 60.

The lower substrate 10 includes a pixel array 14 formed on a lower glass substrate 12. The pixel array includes a thin film transistor (TFT) for switching the pixel, a common electrode and a pixel electrode.

The upper substrate 30 includes RGB color filters 34 formed on an upper glass substrate 32, black matrices 36 formed between the color filters 34 to prevent mix of colored light and an over-coat layer 38 for planarizing the upper substrate 30.

A liquid crystal layer 20 is formed between the lower substrate 10 and the upper substrate 30.

An electrostatic discharge layer (ESD layer) 40 made of indium tin oxide (ITO) is formed on the upper substrate 30. An adhesive layer 50 is formed on the electrostatic discharge layer 40 and a polarizing film 60 is formed thereon.

Regarding the related art liquid crystal display device including the configuration described above, static electricity may be generated during a cleaning operation or an operation of bonding the polarizing film 60 in the fabrication process, and static electricity may be generated during driving for image display. In order to remove static electricity, electrostatic discharge layer 50 is formed.

In this regard, ITO which is a material for the electrostatic discharge layer 50 has a disadvantage of low electrostatic discharge performance due to relative high resistance thereof. Specifically, static electricity that is not effectively discharged from the electrostatic discharge layer 50 permeates the black matrix 36, the over-coat layer 38 and an active area where pixels are formed, thus causing defects such as blur.

SUMMARY OF THE INVENTION

Accordingly, the present invention is directed to a liquid crystal display device and a method for fabricating the same that substantially obviate one or more problems due to limitations and disadvantages of the related art.

An object of the present invention is to provide a liquid crystal display device and a method for fabricating the same to effectively prevent damage and blur defects caused by static electricity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprising first and second substrates joined to each other such that the first and second substrates face each other, a thin film transistor formed on a pixel basis of an active area on the first substrate, a first discharge line formed in a non-active area on the first substrate, the first discharge line surrounding the active area, a protective layer formed over the entire surface of the first substrate, the protective layer covering the thin film transistor and the first discharge line, a second discharge line surrounding an outer region of the first discharge line in the non-active area on the first substrate, the second discharge line being formed on the protective layer, a plurality of contact holes passing through the protective layer to expose a portion of the first discharge line, the contact holes being spaced from one another by a predetermined distance along the first discharge line, a connection pattern branching from the second discharge line, the connection pattern covering the respective contact holes, and an electrostatic discharge layer formed on the outside surface of the second substrate.

In accordance with another aspect of the present invention, provided is a method for fabricating a liquid crystal display device including first and second substrates joined to each other while facing each other, the method comprising forming a thin film transistor on a pixel basis in an active area on the first substrate, forming a first discharge line on the first substrate such that the first discharge line surrounds the active area, forming a protective layer over the entire surface of the first substrate such that the protective layer covers the thin film transistor and the first discharge line, forming a plurality of contact holes passing through the protective layer to expose a portion of the first discharge line such that the contact holes are spaced from one another by a predetermined distance along the first discharge line, forming a second discharge line on the protective layer in the non-active area on the first substrate such that the second discharge line surrounds an outer region of the first discharge line and forming a connection pattern branching from the second discharge line and covering the respective contact holes, and forming an electrostatic discharge layer on the outside surface of the second substrate.

The first discharge line may be formed of the same material as one selected from a gate electrode, a source electrode and a drain electrode constituting the thin film transistor, in the same layer as the selected one.

The first discharge line may be connected to a ground pad formed at a side of the first substrate.

The second discharge line may be formed using the same material as the pixel electrode formed in each pixel in the same layer as the pixel electrode.

A first distance between the first and second discharge lines may be greater than a second distance between the second discharge line and the outermost side surface of the first substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and simultaneously with the description serve to explain the principle of the invention. In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Hereinafter, the liquid crystal display device and the method for fabricating the same according to the present invention will be described in detail with reference to the annexed drawings.

Figure 1:
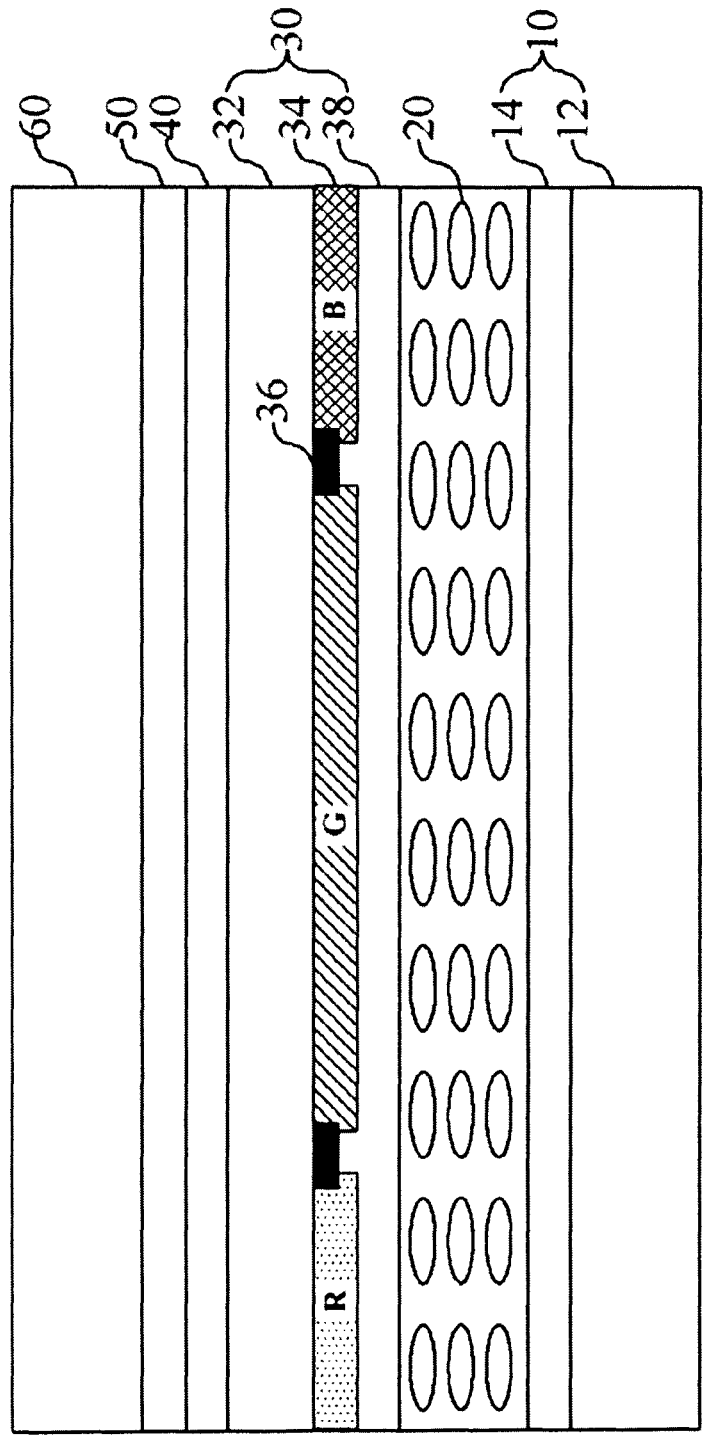
FIG. 1 is a sectional view illustrating a related art liquid crystal display device.
Figure 2:
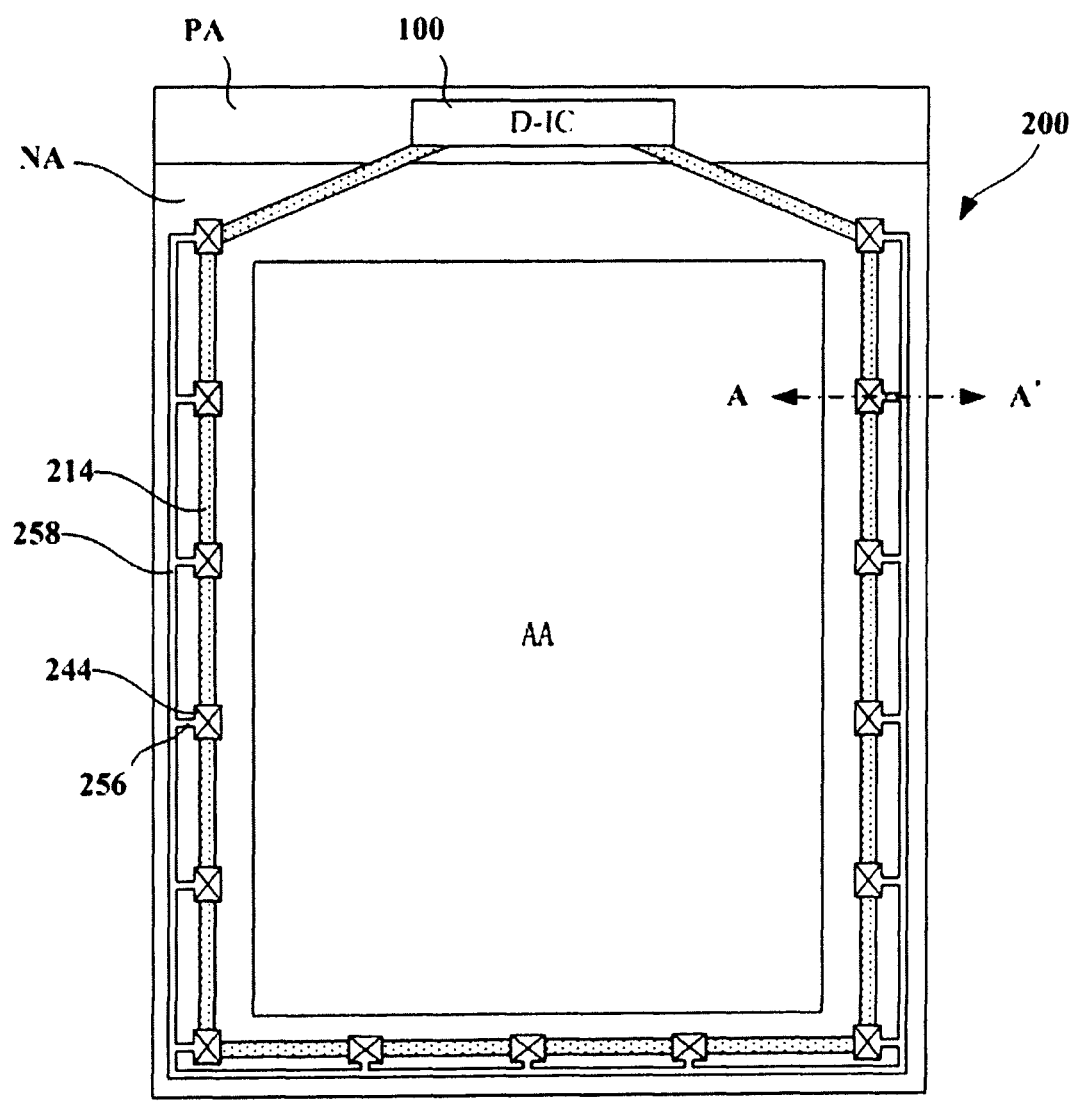
FIG. 2 is a schematic plan view illustrating a liquid crystal display device according to an embodiment of the present invention.
Figure 3:
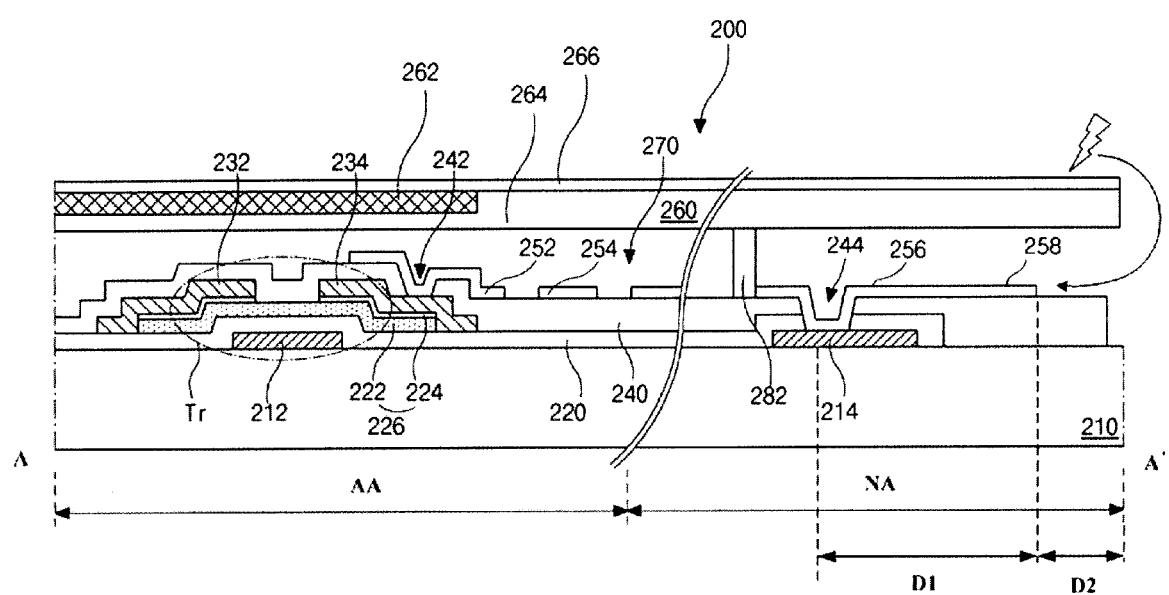
FIG. 3 is a sectional view of the liquid crystal display device taken along the line A-A' shown in FIG. 2.

FIG. 2 is a schematic plan view illustrating a liquid crystal display device according to an embodiment of the present invention. FIG. 3 is a sectional view of a liquid crystal display device 200 taken along the line A-A' shown in FIG. 2.

Referring to FIGS. 2 and 3, the liquid crystal display device 200 according to the present invention includes first and second substrates 210 and 260 joined to each other such that they face each other, a liquid crystal layer 270 interposed between the first and second substrates 210 and 260, and a seal pattern 282 disposed at the edge between the first and second substrates 210 and 260 to prevent leakage of the liquid crystal layer 270.

The liquid crystal display device 200 has an active area AA where a plurality of pixels are formed, a non-active area NA disposed at the periphery of the active area AA, and a pad area PA in which a pad portion (not shown) is formed and a driving IC 100 is mounted.

The present invention effectively prevents damage and blur defects caused by static electricity by forming first discharge line 214 and second discharge line 258 to induce the flow of static electricity to the non-active area NA surrounding the active area AA. The first and second discharge lines 214 and 258 will be described in more detail.

First, referring to the active area AA in FIG. 3, the first substrate 210 is provided with a gate electrode 212, a gate insulating film 220 covering the gate electrode 212, a semiconductor layer 226 which is disposed in a region corresponding to the gate electrode 212 on the gate insulating film 220 and includes an active layer 222 and an ohmic contact layer 224, and a thin film transistor Tr including a source electrode 232 and a drain electrode 234 spaced from each other on the semiconductor layer 226.

The gate insulating film 220 contains an inorganic insulating material such as silicon oxide or silicon nitride. The active layer 222 contains pure amorphous silicon. The ohmic contact layer 224 contains impurity amorphous silicon.

Meanwhile, the first substrate 210 is provided with a plurality of gate lines (not shown) and a plurality of data lines (not shown) connected to the thin film transistor Tr. Each gate line is connected to the gate electrode 212 of the thin film transistor Tr and each data line is connected to the source electrode 232 of the thin film transistor Tr.

The gate lines and the data lines respectively cross each other to define pixel regions P. The thin film transistor Tr connected to the gate and data lines is formed in each of the pixel regions P.

A protective layer 240 including the drain contact hole 242 to expose the drain electrode 234 of the thin film transistor Tr is formed over the entire surface of the first substrate 210 on the thin film transistor Tr. The protective layer 240 contains an organic insulating material such as benzocyclobutene (BCB) or photoacryl, or an inorganic insulating material such as silicon nitride or silicon oxide.

A pixel electrode 252 and a common electrode 254 are formed on the protective layer 240 such that they alternate with each other. The pixel electrode 252 is connected to the drain electrode 234 of the thin film transistor (Tr) via the drain contact hole 242. The pixel electrode 252 forms a lateral electric field with the common electrode 254 to drive the liquid crystal layer 270. As shown in FIG. 3, the pixel electrode 252 and the common electrode 254 are formed in the same layer. Alternatively, the pixel electrode 252 and the common electrode 254 are formed in different layers on the first substrate 210.

Meanwhile, referring to the non-active area NA, a first discharge line 214 is disposed on the first substrate 210. Specifically, the first discharge line 214 is formed so as to surround the active area AA and is connected to a ground pad (not shown) formed in the pad area PA. For reference, the ground pad may be a pad connected to a ground terminal of the driving IC 100 or a pad connected to an exterior circuit film.

The first discharge line 214 is formed of a low-resistance metal material and is formed in the same layer as the gate electrode 212 using the same material as the gate electrode 212. On the other hand, the first discharge line 214 is formed in the same layer as the source and drain electrodes 232 and 234 using the same material as the source and drain electrodes 232 and 234 on the gate insulating film 220. For example, the low-resistance metal material is any one of aluminum (Al), an aluminum alloy (AlNd), molybdenum (Mo), copper (Cu) and a copper alloy.

A gate insulating film 220 and a protective layer 240 are laminated in this order on the first discharge line 214. A plurality of contact holes 244, which expose portions of the first discharge line 214 such that the exposed portions are spaced at a predetermined distance, are formed in the gate insulating film 220 and the protective layer 240.

In addition, the second discharge line 258 is disposed in an outer region of the first discharge line 214 on the first substrate 210. Specifically, the second discharge line 258 is formed on the protective layer 240 so as to surround the first discharge line 214. The second discharge line 258 is electrically connected to the first discharge line 214 through a connection pattern 256 which branches from the second discharge line 258 and covers each of the contact holes 244. The second discharge line 258 is formed on the protective layer 240, which is disposed in the uppermost part of the non-active area NA, thus serving as a lightening rod which induces inflow of static electricity generated in adjacent regions. The static electricity flowing in the second discharge line 258 through the lightening rod is transferred to the first discharge line 214 through the connection pattern 256 and the contact hole 244. The static electricity transferred to the first discharge line 214 is discharged through the ground pad formed in the pad area PA to the outside. In particular, in accordance with the present invention, the first and second discharge lines 214 and 258 are formed in the non-active area NA while surrounding the active area AA, thus effectively discharging static electricity generated in parts of the edge of the liquid crystal display device 200 to the outside.

The second discharge line 258 is formed of the same layer as the pixel electrode 252 and the common electrode 254 using the same material as the pixel electrode 252 and the common electrode 254. That is, the second discharge line 258 is formed of a transparent and conductive material such as ITO or IZO.

Meanwhile, a black matrix 262 disposed in a region corresponding to the thin film transistor Tr to block light and a color filter layer 264 disposed on the black matrix 262 are formed on the second substrate 260. The black matrix 262 and the color filter layer 264 are disposed at an inside surface of the second substrate 260 such that they face the first substrate 210. The black matrix 262 is formed of a black resin.

The electrostatic discharge layer 266 made of a transparent conductive material is formed on an outside surface of the second substrate 260 not facing the first substrate 210. The electrostatic discharge layer 266 discharges static electricity generated in the second substrate 260 to the outside.

Meanwhile, a first distance D1 between the first and second discharge lines 214 and 258 is greater than a second distance D2 between the second discharge line 258 and the outermost side surface of the first substrate 214. This aims at more effectively inducing flow of static electricity by designing the second discharge line 258 to be as close to the outermost surface of the first substrate 214 as possible.

As described above, in accordance with the present invention, first and second discharge lines 214 and 258 are formed in the non-active area NA on the first substrate 210 so as to surround the active area AA. In addition, the first discharge line 214 is formed of a low-resistance metal material and the second discharge line 258 is formed on the protective layer 240 disposed in the uppermost part of the first substrate 210. In addition, the first and second discharge lines 214 and 258 are connected to each other through the contact hole 244. As a result, the second discharge line 258 serves as a lightening rod in one or more regions of the non-active area NA surrounding the active area AA to induce flow of static electricity and static electricity flowing into the second discharge line 258 is discharged through the first discharge line 214 to the outside. Accordingly, in accordance with the present invention, static electricity generated in the second substrate 260 and flowing into the electrostatic discharge layer 266, or static electricity flowing into sides of the first and second substrates 210 and 260 is discharged to the outside through the second discharge line 258 and the first discharge line 214.

As apparent from the foregoing disclosure, the present invention effectively prevents damage and blur defects caused by static electricity by forming first and second discharge lines 214 and 258 for inducing the flow of static electricity to the non-active area (NA) surrounding the active area (AA).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   first and second substrates joined to each other such that the first and second substrates face each other;
   a thin film transistor formed on a pixel basis of an active area on the first substrate,
   a first discharge line formed in a non-active area on the first substrate, the first discharge line surrounding the active area;
   a protective layer formed over the entire surface of the first substrate, the protective layer covering the thin film transistor and the first discharge line;
   a second discharge line surrounding an outer region of the first discharge line in the non-active area on the first substrate, the second discharge line being formed on the protective layer;
   a plurality of contact holes passing through the protective layer to expose a portion of the first discharge line, the contact holes being spaced from one another by a predetermined distance along the first discharge line;
   a connection pattern branching from the second discharge line, the connection pattern covering the respective contact holes; and
   an electrostatic discharge layer formed on an outside surface of the second substrate, the electrostatic discharge layer entirely overlapping the active area,
   wherein a static electricity flowing into the electrostatic discharge layer is discharged through the second discharge line and the first discharge line to an outside.

2. The liquid crystal display device according to claim 1, wherein the first discharge line is formed of the same material as one selected from a gate electrode, a source electrode and a drain electrode constituting the thin film transistor, in the same layer as the selected one.

3. The liquid crystal display device according to claim 2, wherein the first discharge line is connected to a ground pad formed at a side of the first substrate.

4. The liquid crystal display device according to claim 1, wherein the second discharge line is formed using the same material as the pixel electrode formed in each pixel in the same layer as the pixel electrode.

5. The liquid crystal display device according to claim 1, wherein a first distance between the first and second discharge lines is greater than a second distance between the second discharge line and the outermost side of the first substrate at each side.

6. A method for fabricating a liquid crystal display device including first and second substrates joined to each other while facing each other, the method comprising:

forming a thin film transistor on a pixel basis in an active area on the first substrate;

forming a first discharge line on the first substrate such that the first discharge line surrounds the active area;

forming a protective layer over the entire surface of the first substrate such that the protective layer covers the thin film transistor and the first discharge line;

forming a plurality of contact holes passing through the protective layer to expose a portion of the first discharge line such that the contact holes are spaced from one another by a predetermined distance along the first discharge line;

forming a second discharge line on the protective layer in the non-active area on the first substrate such that the second discharge line surrounds an outer region of the first discharge line and forming a connection pattern branching from the second discharge line and covering the respective contact holes; and forming an electrostatic discharge layer on an outside surface of the second substrate, with entirely overlapping the active area, wherein a static electricity flowing into the electrostatic discharge layer is discharged through the second discharge line and the first discharge line to an outside.

7. The method according to claim 6, wherein the first discharge line is formed of the same material as one selected from a gate electrode, a source electrode and a drain electrode constituting the thin film transistor in the same layer as the selected one.

8. The method according to claim 7, wherein the first discharge line is connected to a ground pad formed at a side of the first substrate.

9. The method according to claim 6, wherein the second discharge line is formed of the same material as the pixel electrode formed in each pixel in the same layer as the pixel electrode.

10. The method according to claim 6, wherein a first distance between the first and second discharge lines is greater than a second distance between the second discharge line and the outermost side of the first substrate at each side.

* * * * *